(12) United States Patent
Kraft et al.

(10) Patent No.: US 7,624,951 B1
(45) Date of Patent: Dec. 1, 2009

(54) AIRCRAFT WITH ANTENNAS MOUNTED ON THE TOPS AND BOTTOMS OF AERODYNAMIC-SURFACE EXTENSIONS

(75) Inventors: John R. Kraft, Rose Hill, KS (US); Jason A. Stevens, Wichita, KS (US); Joshua T. Goff, Wichita, KS (US); Frank J. Rowe, Wichita, KS (US)

(73) Assignee: Hawker Beechcraft Corporation, Wichita, KS (US)

( * ) Notice: Subject to any disclaimer, the term of this patent is extended or adjusted under 35 U.S.C. 154(b) by 631 days.

(21) Appl. No.: 11/499,223

(22) Filed: Aug. 4, 2006

(51) Int. Cl.
*H01Q 1/28* (2006.01)
(52) U.S. Cl. .................. 244/199.4; 244/1 R; 343/708
(58) Field of Classification Search .............. 244/1 R, 244/199.4, 199.2, 45 R, 91; 343/705, 708
See application file for complete search history.

(56) References Cited

U.S. PATENT DOCUMENTS

| | | | |
|---|---|---|---|
| 4,714,215 A | 12/1987 | Jupp et al. | |
| 6,577,272 B1 | 6/2003 | Madden | |
| 6,653,980 B2 | 11/2003 | Ceccom et al. | |
| 6,873,296 B2 * | 3/2005 | Langley et al. | 343/705 |
| 6,954,182 B2 | 10/2005 | Knapp | |
| 7,019,681 B1 | 3/2006 | Pellett et al. | |
| 2008/0210822 A1 * | 9/2008 | Hanusa et al. | 244/129.1 |

* cited by examiner

*Primary Examiner*—Timothy D Collins
(74) *Attorney, Agent, or Firm*—Lerner, David, Littenberg, Krumholz & Mentlik, LLP

(57) ABSTRACT

An aircraft has a fuselage and a pair of wings joined to the fuselage at a dihedral angle. A wing extension, such as an angled winglet or a wing-tip pod, is joined to a distal end of each of the wings. A top-surface antenna lies in each of the top surfaces, and a bottom-surface antenna lies in each of the bottom surfaces. The antennas are preferably flat-panel antennas such as phased-array antennas.

18 Claims, 8 Drawing Sheets

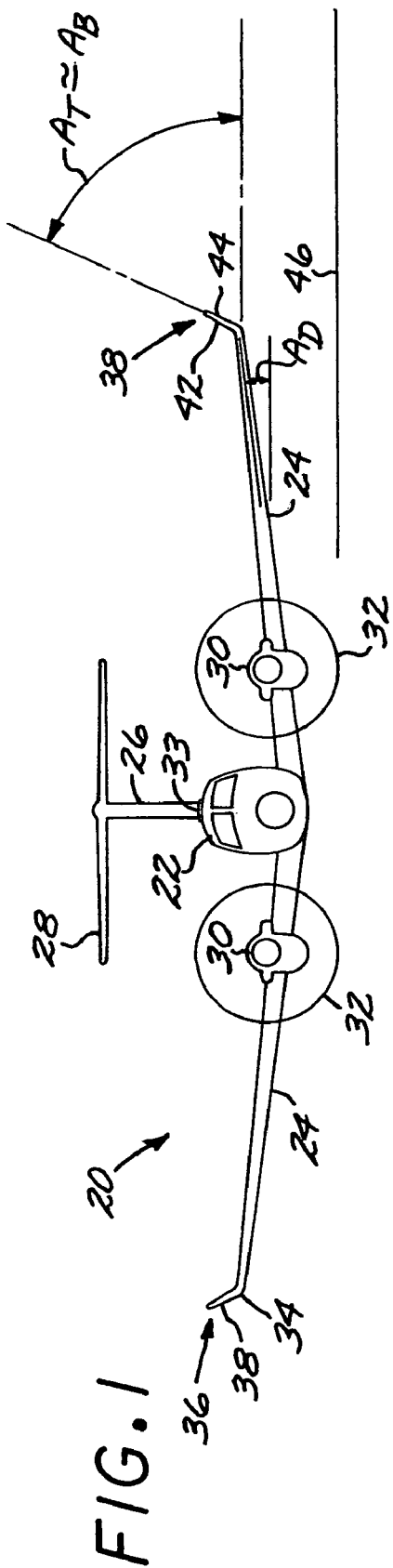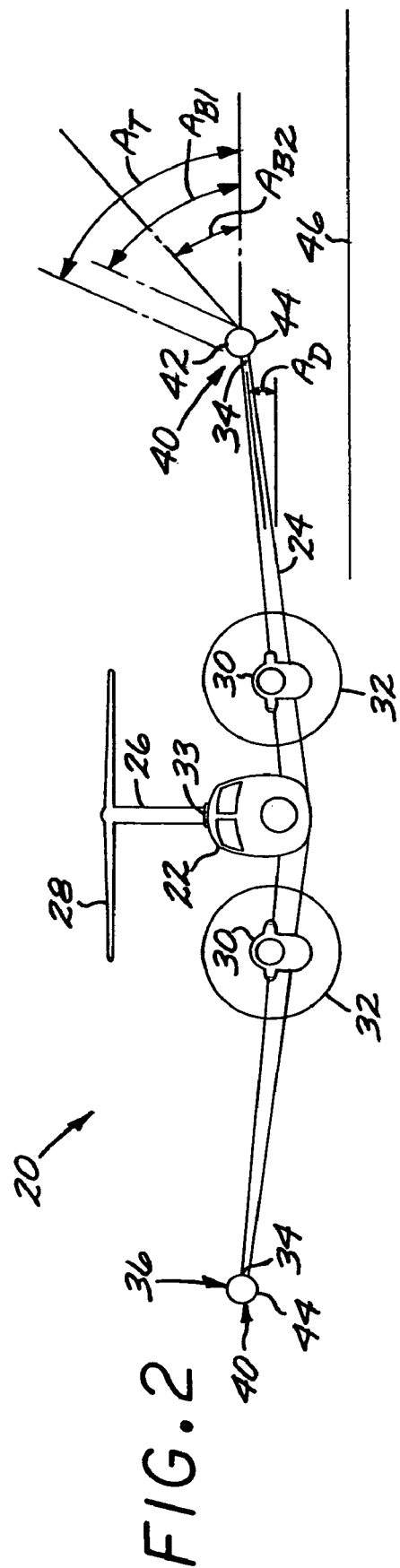

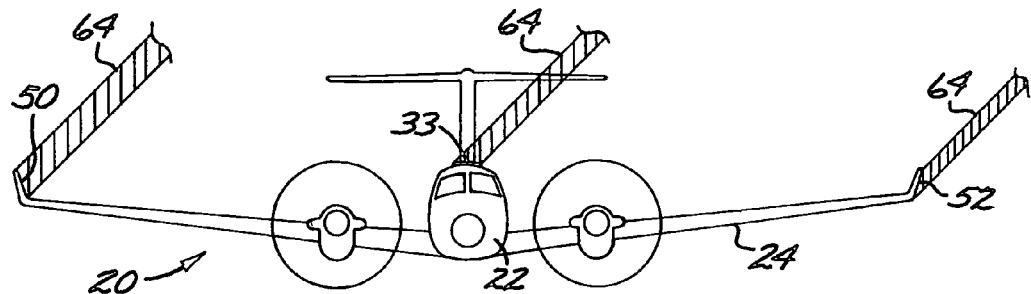
FIG. 8
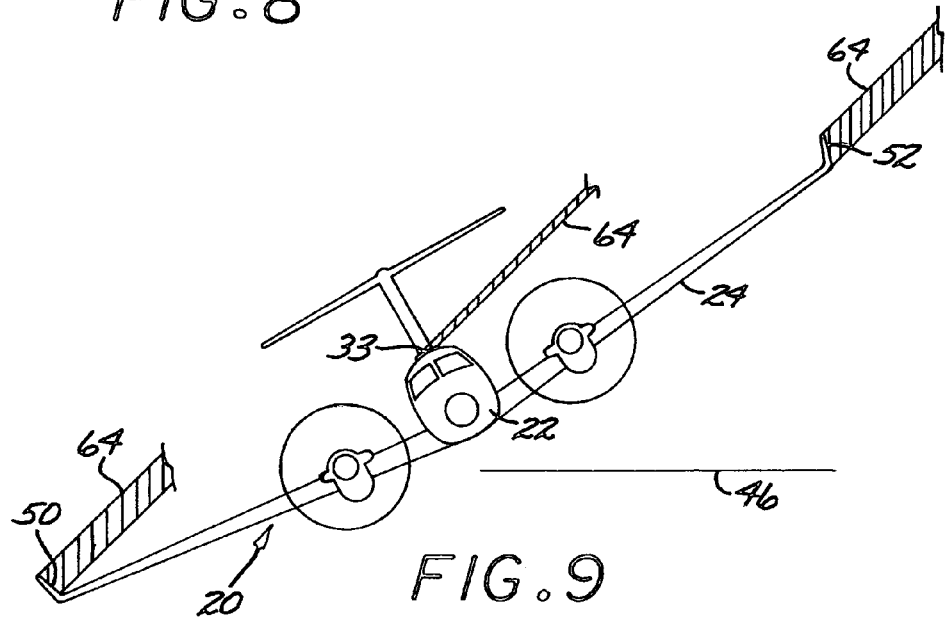
FIG. 9
FIG. 10
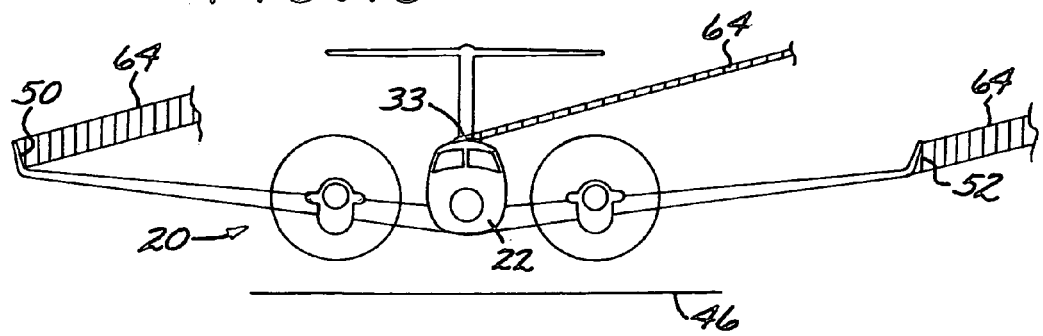

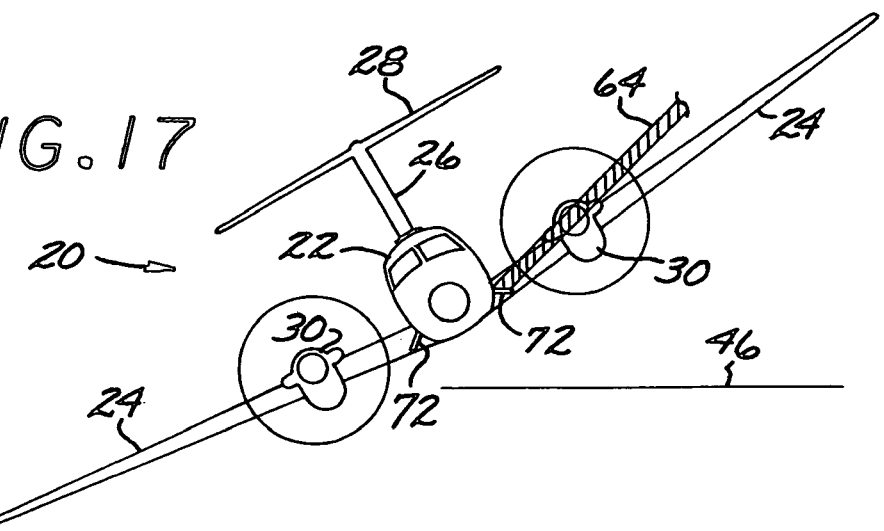
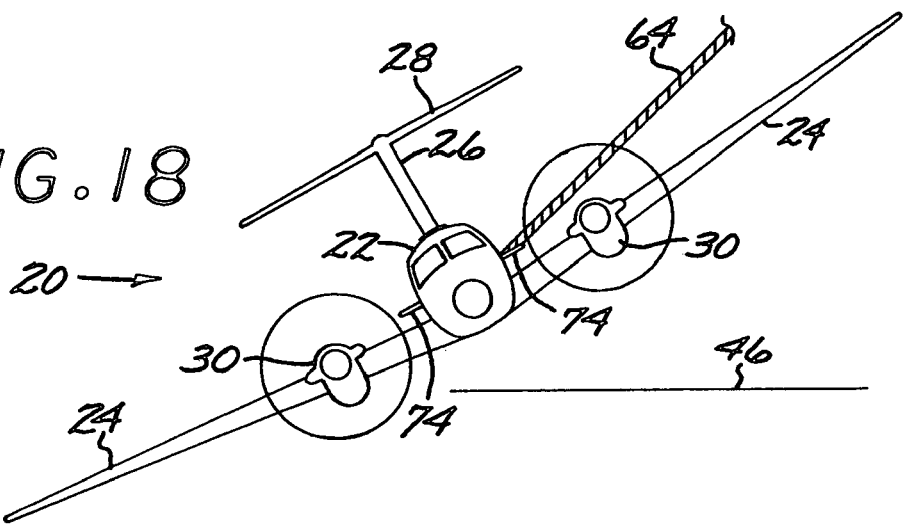
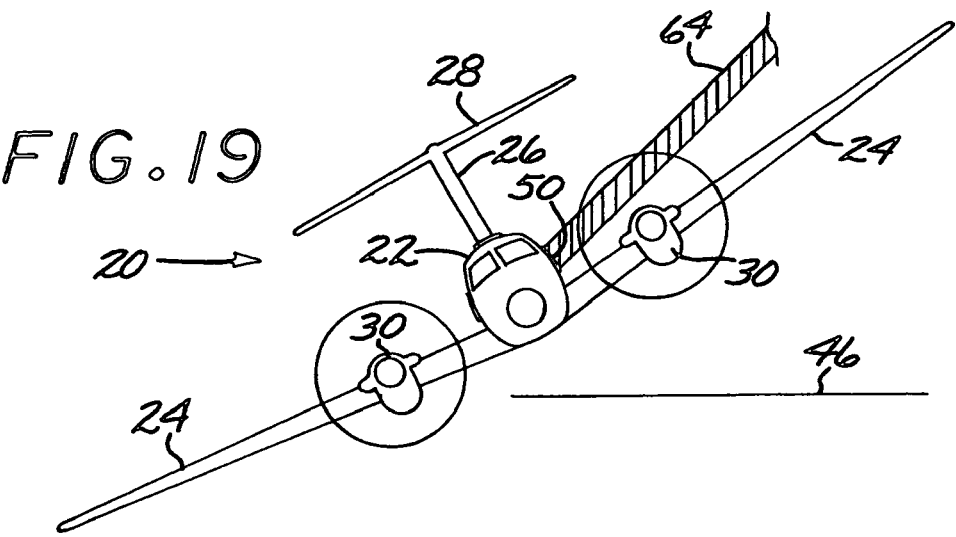

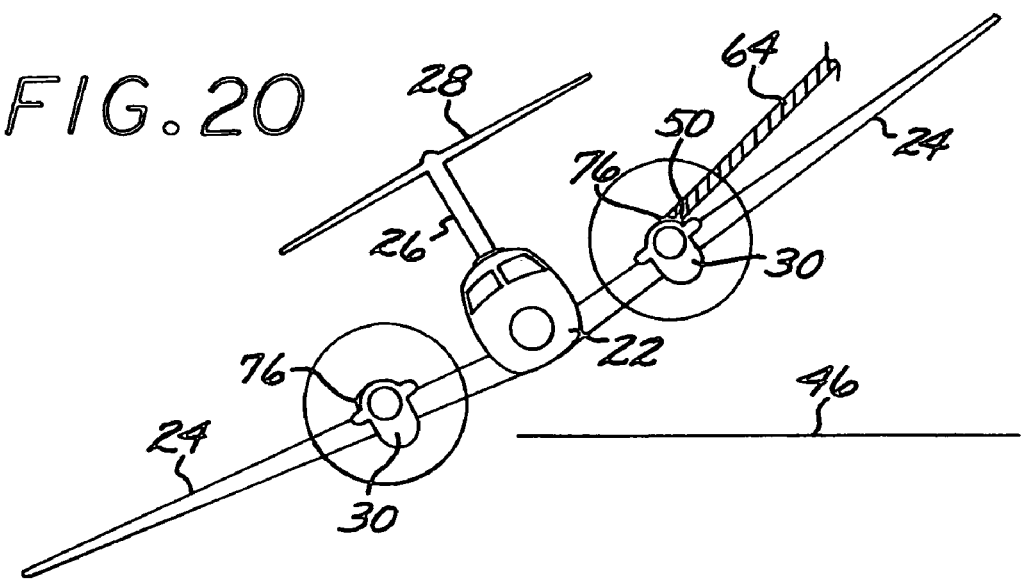
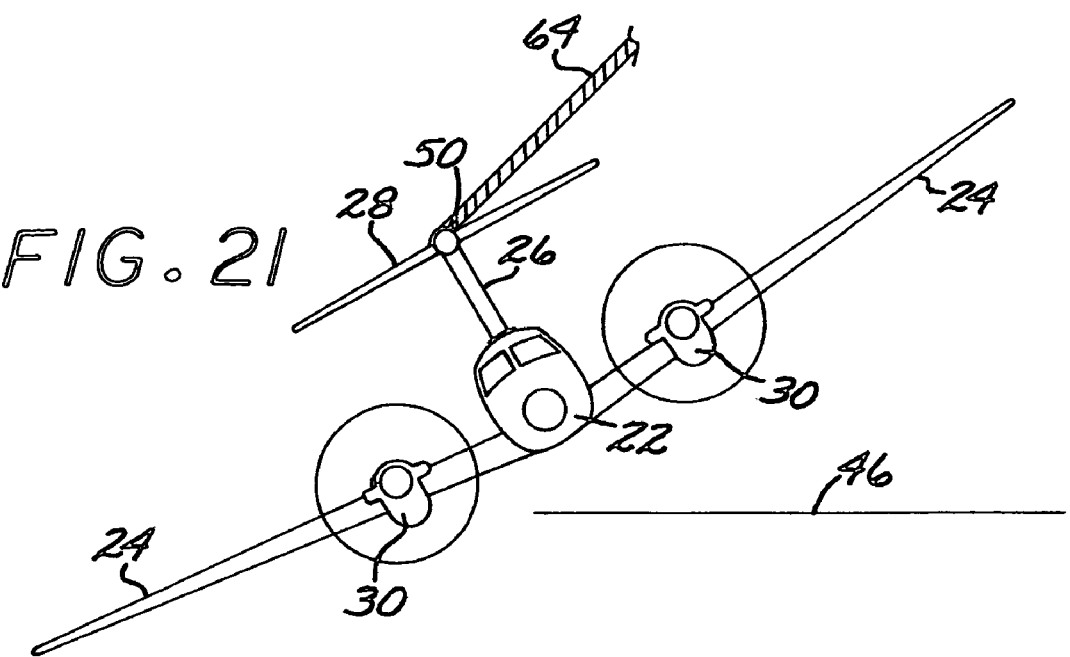

AIRCRAFT WITH ANTENNAS MOUNTED ON THE TOPS AND BOTTOMS OF AERODYNAMIC-SURFACE EXTENSIONS

This invention relates to an aircraft and, in particular, to an aircraft configuration having transceiving antennas positioned on the aircraft to optimize certain types of transmissions.

BACKGROUND OF THE INVENTION

Traditionally, aircraft communications have been between ground stations and the aircraft, or between two adjacent aircraft. Ground communications may be interrupted for various reasons, and more recently communications links have been developed between orbiting satellites and aircraft. Transmissions between communications satellites in geostationary or geosynchronous (geostationary/geosynchronous) orbit and aircraft in flight are becoming increasingly important. Transmitted information can include, for example, internet uplinks and downlinks, audio and video entertainment, business information, and information relevant to the aircraft's flight operations such as weather and navigation data.

Maintaining a robust, uninterrupted communications link between an aircraft in flight and a geosynchronous/geostationary satellite is a challenging geometric problem. Geostationary satellites, to cite an example, are in orbit above a fixed position on the equator. When an aircraft is flying in straight-and-level flight near the equator, the linked geostationary satellite is usually at a relatively high elevational angle from the aircraft. On the other hand, when the aircraft is flying at a high latitude, the geostationary satellite is typically at a much lower elevational angle relative to the aircraft. The elevation and azimuth of the geostationary satellite relative to the aircraft also change as the aircraft banks, changes its direction of flight, and climbs or descends.

To facilitate communication links at various positions of the aircraft over the earth, large aircraft typically utilize tracking dish antennas or the like. A steerable dish antenna may be mounted, for example, in a radome on the top of the vertical tail. As the aircraft flies, the elevation and azimuth of the steerable dish antenna are adjusted as needed to point toward the linked satellite. However, steerable dish antennas are too bulky, heavy, and expensive for many smaller aircraft, such as most business and private aircraft.

There is a need for an aircraft-mounted approach that provides a robust communications link between the aircraft and a satellite or other airborne transceiver, for virtually all normally encountered locations, flight paths, and flight attitudes of the aircraft. The present invention fulfills this need, and further provides related advantages.

SUMMARY OF THE INVENTION

The present approach provides an aircraft with an antenna structure having a continuous line-of-sight communications link with a satellite or other external communications site. This communications link is maintained regardless of the aircraft's location relative to the earth's surface, its flight direction, and its flight attitude, in normally encountered conditions of aircraft operation. That is, when the aircraft changes direction or changes its flight attitude, such as a bank, a dive, or a climb, the line of sight to the satellite or other external communications site is maintained. An important feature of the present approach is that the antenna system may be provided in new aircraft construction, and also as a retrofit for existing smaller-aircraft constructions.

The antenna system preferably uses electronically steered antennas, which are light in weight and flat in configuration, rather than the heavier mechanically steerable antennas used in large aircraft such as commercial airliners. Consequently, the present approach is suitable for use in smaller business and personal aircraft, although it may be used with larger aircraft as well to save weight. Phased array antennas allow effective electronic steering of the antenna without physically moving the antenna. Phased array antennas can be made in a flat-panel form that is lighter than the steerable dish antenna taken with its support equipment.

In accordance with the invention, an aircraft comprises a fuselage, and a first aerodynamic surface, such as a wing, joined to the fuselage and having a first distal end remote from the fuselage. The first aerodynamic surface has a first dihedral angle relative to a horizontal plane. A first-aerodynamic-surface extension is joined to the first distal end of the first aerodynamic surface. The first-aerodynamic-surface extension has a first-aerodynamic-surface-extension top surface and a first-aerodynamic-surface-extension bottom surface. The first-aerodynamic-surface-extension top surface lies at a nonzero first-aerodynamic-surface-extension top-surface angle to the horizontal plane that is different from the first dihedral angle. The first-aerodynamic-surface-extension bottom surface lies at a nonzero first-aerodynamic-surface-extension bottom-surface angle to the horizontal plane that is different from the first dihedral angle. A first-extension top-surface antenna lies in the first-aerodynamic-surface-extension top surface of the first-aerodynamic-surface extension, and a first-extension bottom-surface antenna lies in the first-aerodynamic-surface-extension bottom surface of the first-aerodynamic-surface extension.

Preferably, each of the first-extension top-surface antenna and the first-extension bottom-surface antenna are flat-panel antennas. Electronically steered phased-array antennas may be used.

Preferably, each of the first-aerodynamic-surface-extension top-surface angle and the first-aerodynamic-surface-extension bottom-surface angle is from about 30 to about 75 degrees. A most preferred first-aerodynamic-surface-extension top-surface angle or first-aerodynamic-surface-extension bottom-surface angle is about 65 degrees.

The first-aerodynamic-surface extension may be of any operable type. In a preferred approach, the first-aerodynamic-surface extension is a winglet. That is, the first-aerodynamic-surface extension may be an up-angled or down-angled aerodynamic surface that not only provides the site for the first-extension top-surface antenna and the first-extension bottom-surface antenna, but also provides improved aerodynamic performance for the aircraft by controlling wing-tip vortices and by other effects. The first-aerodynamic-surface extension may also be a wing-tip pod that provides the site for the first-extension top-surface antenna and the first-extension bottom-surface antenna. The wing-tip pod may optionally provide additional cargo-carrying capacity or fuel-carrying capacity that is needed on some smaller business and personal aircraft. Both winglets and wing-tip pods may have flat panel antennas of the phased-array type made a part of their upper and lower surfaces. Winglets and/or wing-tip pods may be provided in new-make aircraft, but also may be readily added on as aftermarket retrofits to existing aircraft.

The present approach may be implemented with a single pair of extension antennas that improve the line-of-sight communications-link capability in some flight attitudes. Alternatively and even more preferably, extension antennas are provided for both aerodynamic surfaces of a pair. That is, in the aircraft described above, there is a second aerodynamic surface, such as a wing, joined to the fuselage. The second aerodynamic surface extends generally oppositely to the first aerodynamic surface and has a second distal end remote from the fuselage. The second aerodynamic surface has a second dihedral angle relative to the horizontal plane. A second-aerodynamic-surface extension is joined to the second distal end of the second aerodynamic surface. The second-aerodynamic-surface extension has a second-aerodynamic-surface-extension top surface and a second-aerodynamic-surface-extension bottom surface. The second-aerodynamic-surface-extension top surface lies at a nonzero second-aerodynamic-surface-extension top-surface angle to the horizontal plane that is different from the second dihedral angle, and the second-aerodynamic-surface-extension bottom surface lies at a nonzero second-aerodynamic-surface-extension bottom-surface angle to the horizontal plane that is different from the second dihedral angle. A second-extension top-surface antenna lies in the second-aerodynamic-surface-extension top surface of the second-aerodynamic-surface extension, and a second-extension bottom-surface antenna lies in the second-aerodynamic-surface-extension bottom surface of the second-aerodynamic-surface extension.

The aircraft structure may be symmetrical about the centerline of the fuselage, with the second-aerodynamic-surface-extension-top-surface angle equal to the first-aerodynamic-surface-extension top-surface angle, and the second-aerodynamic-surface-extension bottom-surface angle equal to the first-aerodynamic-surface-extension bottom-surface angle, or the aircraft structure may be asymmetrical. In an even more preferred embodiment, the second-aerodynamic-surface-extension-top-surface angle, the first-aerodynamic-surface-extension top-surface angle, the second-aerodynamic-surface-extension-bottom-surface angle, and the first-aerodynamic-surface-extension-bottom-surface angle are all the same numerical value. The aircraft structure may instead be asymmetrical.

It is preferred that the aerodynamic surfaces be the wings of the aircraft although, as will be discussed, other aerodynamic surfaces may be used. Thus, in a preferred design, an aircraft comprises a fuselage, and a pair of wings joined to the fuselage. Each wing has a distal end remote from the fuselage, and each wing is oriented at a dihedral angle to a horizontal plane. A wing extension is joined to the distal end of each of the wings. Each of the wing extensions has a top surface and a bottom surface. The top surfaces lie at a nonzero top-surface angle to the horizontal plane that is different from the dihedral angle, and the bottom surfaces lie at a nonzero bottom-surface angle to the horizontal plane that is different from the dihedral angle. A top-surface antenna lies in one of the top surfaces, and a bottom-surface antenna lies in one of the bottom surfaces. Other compatible features discussed herein may be used with this embodiment.

The present approach provides transceiving antennas that are positioned at angles such that at least one of the antennas remains in line-of-sight contact with remote transceiving sites at all times, regardless of the location of the aircraft or its flight attitude. When the aircraft banks, two antennas on the side of the aircraft that dips down are not obscured by the aircraft structure, and at least one of the two antennas remains in line-of-sight communication with the remote site. As long as at least one antenna remains in a line, of sight with the remote site, communications is maintained. The present approach is also compatible with existing antennas mounted to the top, bottom, or sides of the aircraft's fuselage, and with tail-mounted or horizontal-stabilizer-mounted antennas. The use of lightweight flat panel antennas makes practical the use of multiple antennas to maintain the communications links.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a front view of an aircraft according to the present approach with transceiving antennas in winglets, with the aircraft in level flight;

FIG. 2 is a front view of an aircraft according to the present approach with transceiving antennas in wing-tip pods, with the aircraft in level flight;

FIG. 8 is a schematic antenna-coverage indication for an aircraft flying in level flight at 37 degrees latitude;

FIG. 9 is a schematic antenna-coverage indication for an aircraft flying at 37 degrees latitude in a 30 degree bank away from the remote link;

FIG. 10 is a schematic antenna-coverage indication for an aircraft flying at 70 degrees latitude in level flight;

FIG. 17 is a schematic antenna-coverage indication for an aircraft using extension-mounted antennas on fuselage strakes flying at 37 degrees latitude in a 30 degree bank away from the remote link;

FIG. 18 is a schematic antenna-coverage indication for an aircraft using stabilon-mounted antennas flying at 37 degrees latitude in a 30 degree bank away from the remote link;

FIG. 19 is a schematic antenna-coverage indication for an aircraft using antennas mounted on the sides of the fuselage flying at 37 degrees latitude in a 30 degree bank away from the remote link;

FIG. 20 is a schematic antenna-coverage indication for an aircraft using antennas mounted on the engine cowling flying at 37 degrees latitude in a 30 degree bank away from the remote link; and FIG. 21 is a schematic antenna-coverage indication for an aircraft using antennas mounted on the top of the vertical tail flying at 37 degrees latitude in a 30 degree bank away from the remote link.

DETAILED DESCRIPTION OF THE INVENTION

Figure 3:
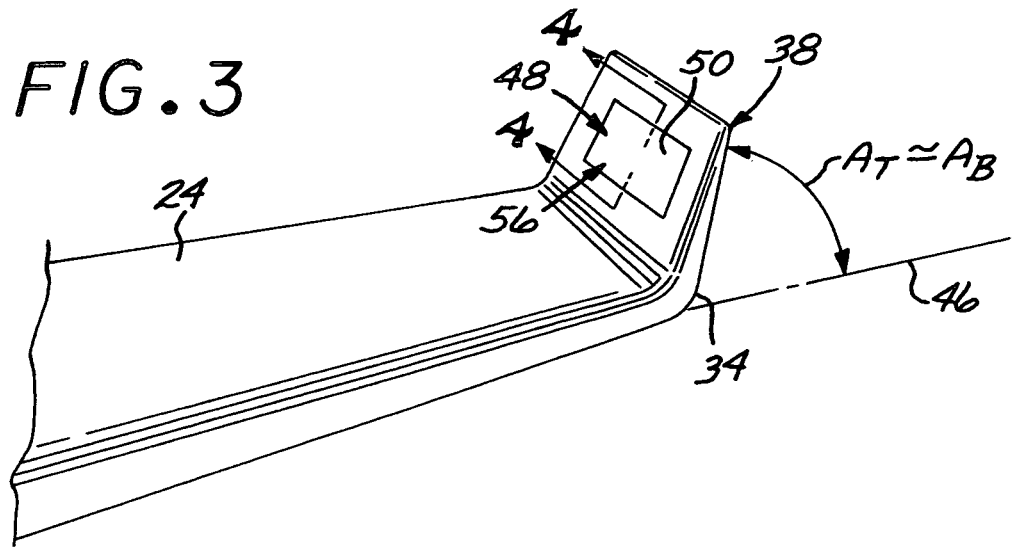
FIG. 3 is a perspective view of a single-panel flat antenna built into a wing-tip extension.

Preferred embodiments of the approach of the present invention are used in conjunction with an aircraft such as the aircraft 20 illustrated in FIGS. 1-2. The illustrated aircraft 20 has a fuselage 22, at least one wing 24 that serves as an aerodynamic surface joined to the fuselage 22, a vertical tail 26, and horizontal stabilizers 28, which are joined to the vertical tail 26 in the depicted aircraft 20. The wing is oriented at a dihedral angle $A_D$ to a horizontal plane 46 when the aircraft 20 is in a level orientation. The horizontal plane 46 is a reference plane that is perpendicular to a radius of the earth passing through the aircraft 20, and thence is generally parallel to the local surface of the earth at the location of the aircraft. The wings of most aircraft have a small positive dihedral angle $A_D$, although aircraft having zero or negative dihedral-angle wings are known.

As used herein, "fuselage" is broadly defined to be the area of the aircraft, usually lying along the forward-flight-direction centerline of the aircraft, where the majority of cargo and passengers are positioned when the aircraft is in flight. In this broad view of "fuselage", examples of fuselages include the enclosed centerline passenger, equipment, and luggage compartment typical of most aircraft; downwardly suspended seating area found in ultralight and related types of aircraft; and the centerline compartment of a flying wing. The present concept of "aircraft" also extends in other embodiments to helicopters that do not have conventional wings, but have aerodynamic and/or support surfaces extending therefrom. All of these types of aircraft may benefit from using the present approach.

The aircraft may be powered or unpowered. The illustrated aircraft 20 is a powered aircraft, with two wing-mounted propeller engines 30 and their respective propellers 32. Aircraft 20 often have an antenna 33, termed a conformal antenna, built into the top surface of the fuselage 22 and protruding only slightly therefrom. The conformal antenna 33 usually extends lengthwise along the fuselage 22. There are many variations of this general design for unmanned and manned, personal, business, and military aircraft that can beneficially use the present approach. The only requirement for this preferred embodiment is that the aircraft has the proper support surfaces for the antenna(s), as will be described.

Each wing 24 has a respective distal end 34 remote from the fuselage 22. A wing extension 36 is joined to the distal end 34 of at least one of the wings 24. In the illustrated preferred embodiment, there is a wing extension 36 at the distal end of each of the two wings 24. Asymmetric designs with only one wing extension 36 are possible but not favored.

The wing extensions 36 may be of any operable type. FIG. 1 illustrates a most-preferred type of wing extension 36, which is an upwardly (as pictured, or downwardly in other embodiments) angled extension of the structure of the wing 24. The wing extension 36 of FIG. 1 is sometimes known as a winglet 38. Another type of wing extension 36 is a wing-tip pod 40, illustrated in FIG. 2. The wing-tip pod 40 may be, for example, an empty pod, a cargo-storage pod, or a wing-tip fuel tank that is used for the storage of fuel to extend the range of the aircraft 20.

Each of the wing extensions 36 has a top surface 42 and a bottom surface 44. The terms "top" and "bottom" are reference terms to indicate directions relative to the horizontal plane 46 when the aircraft 20 is in straight and level flight, and are used here in a manner consistent with their normal usage in the aircraft field. A vector perpendicular to and extending outwardly from the top surface 42 points generally away from the earth when the aircraft 20 is in straight and level flight, and a vector perpendicular to and extending outwardly from the bottom surface 44 points generally toward the surface of the earth when the aircraft is in straight and level flight.

The top surface 42 lies at a nonzero top-surface angle $A_T$ to its respective wing 24. The bottom surface 44 lies at a nonzero bottom-surface angle $A_B$ to its respective wing 24. (Unless otherwise specified, angles herein are measured from the horizontal plane 46.) Thus, the angles $A_T$ and $A_B$ are independent of any wing dihedral angle $A_D$, but they may not be the same as the wing dihedral angle $A_D$. If the $A_T$ and/or $A_B$ were the same as $A_D$, the wing extension 36 would not be angled with respect to the wing 24.

In the case of the planar winglet 38 type of wing extension 36 illustrated in FIG. 1, the top surface 42 and the bottom surface 44 are normally approximately parallel to each other so that $A_T$ and $A_B$ are about the same (i.e., within 3 degrees of each other). In the case of the wing-tip pod 40 type of wing extension 36, there is a continuum of possible top surfaces 42 and bottom surfaces 44, and the top surface 42 may or may not be parallel to the bottom surface 44; that is, $A_T$ and $A_B$ may be the same or different. In FIG. 2, there are illustrated bottom surface angles 44 of $A_{B1}$ that is equal to $A_T$, and $A_{B2}$ that is not equal to $A_T$. In the illustrated preferred embodiments, the aircraft 20 is symmetrical in that the wing extensions 36 and antenna structures to be described subsequently of the two wings 24 are the same (but mirror images about the centerline of the aircraft 20 of each other), but that need not be the case. The wing extensions 36 and antenna structures on the opposite wings 24 may instead be different in the sense that they are not mirror images of each other.

The top-surface angle $A_T$ and the bottom-surface angle $A_B$ are each preferably from about 30 to about 75 degrees. More preferably, the top-surface angle $A_T$ and the bottom-surface angle $A_B$ are each about 65 degrees. (As noted earlier, these angles are measured from the horizontal plane 46.) These angles are optimal for the functioning of the antenna structures to be described next.

Antenna structures 48 are provided in the wing extensions 36. The antenna structures 48 are present in the illustrations of FIGS. 1-2, but are seen more readily in the illustrations of FIGS. 3-6. The antenna structures 48 are described in relation to the preferred winglet 38 wing extension 36, but may be provided in the wing-tip pod 40 or other types of wing extensions 36 as well. A top-surface antenna 50 lies in at least one, and preferably both, of the top surfaces 42 of the wing extensions 36. A bottom-surface antenna 52 lies in at least one, and preferably both, of the bottom surfaces 44 of the wing extensions 36. Only the top-surface antenna 50 is seen in the perspective views of FIGS. 3 and 6, but both the top-surface antenna 50 and the bottom-surface antenna 52 are seen in the sectional views of FIGS. 4-5.

The aircraft 20 must have at least one top-surface antenna 50 and at least one bottom-surface antenna 52. For example, there could be a top-surface antenna 50 and a bottom surface antenna 52 in the left wing extension 36, and no antennas in the right wing extension, or vice versa. The top-surface antenna 50 could be in the left wing extension 36 and the bottom-surface antenna 52 could be in the right-wing extension 36. However, such placements can result in antenna blind spots under certain conditions. More preferably, there are two top-surface antennas 50 and two bottom-surface antennas 52, one pair in the wing extension 36 on each wing 24.

The top-surface antenna 50 and the bottom-surface antenna 52 are preferably each flat-panel antennas. More preferably, the top-surface antenna 50 and the bottom-surface antenna 52 are each phased-array antennas. Phased-array antennas are known in other applications. Such phase-array antennas transmit and/or receive signals at frequencies for which they are designed. They are well suited for use in the present application, because they may be constructed as flat panels whose input and output beam directions may be electronically steered without any moving parts and/or movement of the flat panel, phased-array antenna.

Figure 4:
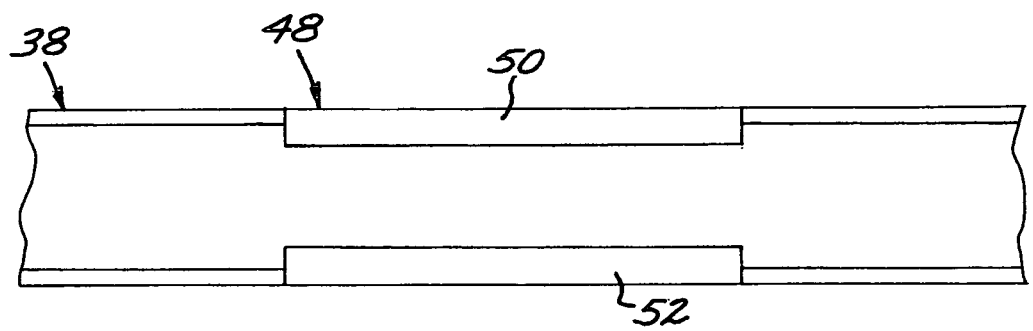
FIG. 4 is an enlarged sectional view of a first embodiment of the single-panel flat antenna and wing-tip extension of FIG. 3, taken along line 4-4.
Figure 5:
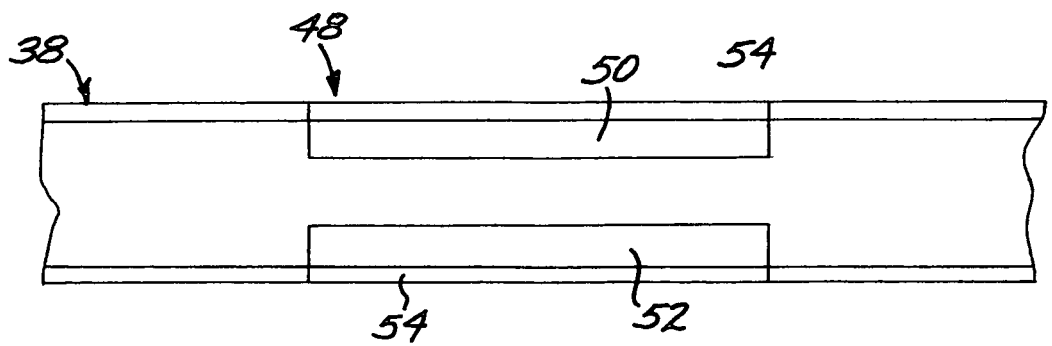
FIG. 5 is an enlarged sectional view of a second embodiment of the single-panel flat antenna and wing-tip extension of FIG. 3, taken along line 4-4.
Figure 6:
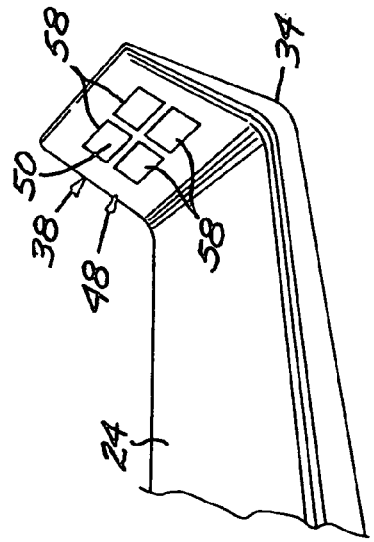
FIG. 6 is a perspective view of a multipanel antenna built into a wing-tip extension.

As shown in FIG. 4, the top-surface antenna 50 and the bottom-surface antenna 52 may be constructed flush with the respective top surface 42 and bottom surface 44 of the wing extension 36. As shown in FIG. 5, the top-surface antenna 50 and the bottom-surface antenna 52 may instead be constructed to underlie a skin 54 that is flush with the respective top surface 42 and bottom surface 44 of the wing extension 36. Where used, the skin 54 protects the top-surface antenna 50 and the bottom-surface antenna 52, and also serves as an aerodynamic skin surface. The skin 54 must be transparent or nearly transparent to the wavelength(s) transmitted or received by the top-surface antenna 50 and the bottom-surface antenna 52. Signal-transparent polymeric and composite materials are known for other applications, and may be used here.

The top-surface antenna 50 and the bottom-surface antenna 52 may both be flush-mounted types, as illustrated in FIG. 4, or they may be both underskin types, as illustrated in FIG. 5. They may instead be mixed, with one being of the flush-mounted type and the other being of the underskin type.

One or both of the top-surface antenna 50 and the bottom-surface antenna 52 may be of monolithic construction, as in FIG. 3, where there is a single panel 56 of each antenna. One or both of the top-surface antenna 50 and the bottom-surface antenna 52 may be of segmented-panel construction, as in FIG. 6, where the antenna is formed of an array of subpanels 58. Both antennas 50 and 52 may be of the same single-panel type, both may be of the subpanel type, or one may be of one type and the other of the other type.

Figure 7:
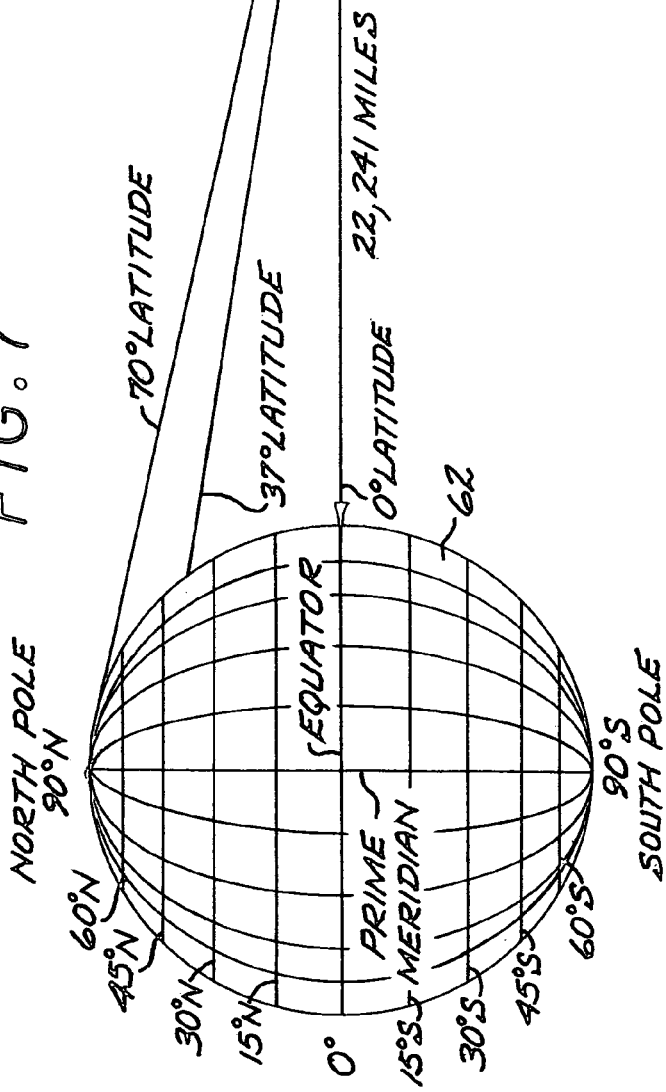
FIG. 7 is a schematic illustration of a geostationary satellite in orbit about the earth.
Figure 11:
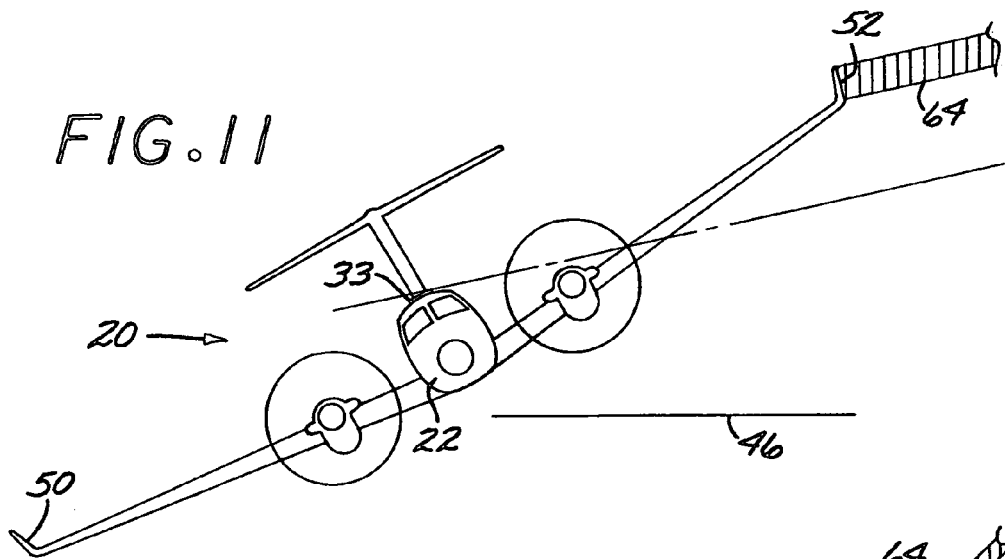
FIG. 11 is a schematic antenna-coverage indication for an aircraft flying at 70 degrees latitude in a 30 degree bank away from the remote link.

One of the more important applications of the present approach is to facilitate communications via communications links between aircraft in flight and orbiting satellites such as geosynchronous or geostationary communications satellites. FIG. 7 schematically illustrates the geometrical relation between such a geostationary communications satellite 60 and the earth 62. The geostationary communications satellite 60 orbits the earth 62 at a fixed location 22,241 miles above sea level at the equator (i.e., 0 degrees latitude). The present approach is also applicable to communications to and from other remote links such as geosynchronous satellites, low-earth-orbit satellites, medium-earth-orbit satellites, and high-flying aircraft. The following discussion is in terms of communications links with the geostationary communications satellite 60, but it is equally applicable to communications links with these other types of remote links.

The geostationary communications satellites offer data used for radio communications, navigation, weather status and forecasting, television, internet and related communications, entertainment, and other applications. It may be expected that the types of applications will be expanded and the existing services supplemented in the future. There is a constellation of such geostationary communications satellites offering similar services, so that an aircraft flying at 0 degrees latitude will typically have a geostationary communications satellite 60 at a relative high angle (i.e., above) to the aircraft 20. On the other hand, as can be seen from FIG. 7, when the aircraft 20 flies at intermediate higher latitudes, such as in the continental United States, the geostationary communications satellite 60 is lower in the sky. A typical latitude of the aircraft 20 flying over the central United States (in a north-south sense) is about 37 degrees. For an aircraft operating even further north, for example over Canada at a latitude of 70 degrees, the geostationary communications satellite is even lower in the sky.

For fixed ground transceivers, the latitude is not a great concern in maintaining line-of-sight communications with the geostationary communications satellite 60, except at very high latitudes. The satellite communications dish of the ground receiver is simply pointed at the correct fixed location in the sky. For an aircraft that flies in different directions and different attitudes (e.g., straight-and-level, banking left, banking right, climbing, diving), the problem of maintaining continuous line-of-sight communications is increasingly difficult at progressively higher latitudes, as illustrated in FIGS. 8-9 for the aircraft 20 flying at 37 degrees latitude, and in FIGS. 10-11 for the aircraft 20 flying at 70 degrees latitude. In FIGS. 8-11, the shaded areas represent lines of sight 64 for the antennas with the geostationary communications satellite 60, which is out of the illustration.

The aircraft 20 that is flying straight and level at 37 degrees latitude, FIG. 8, has a clear line of sight 64 to the geostationary communications satellite 60 with the conformal antenna 33 and with one of the top-surface antennas 50 and one of the bottom-surface antennas 52. When the aircraft 20 banks 30 degrees to the right, FIG. 9, these lines of sight 64 are maintained. If the aircraft 20 were to bank to an even higher angle, the line of sight 64 of the conformal antenna 33 would be partially obscured by the structure of the left wing 24, and communications with the geostationary communications satellite 60 would be lost if the conformal antenna 33 were the only available transceiving antenna structure. On the other hand, the line of sight communication would be maintained by the left-side bottom-surface antenna 52. The result is uninterrupted communication between the aircraft 20 and the satellite 60, because it is necessary to maintain the line of sight 64 with only one antenna 33, 50, 52, although it is preferred to maintain the line of sight 64 with more than one antenna at any moment to ensure a robust communications link. "Robust" in this context means that the line of sight 64 is not lost when there are variations in the direction of flight or the slight attitude of the aircraft 20.

The aircraft 20 that is flying straight and level at 70 degrees latitude, FIG. 10, has a clear line of sight 64 with the geostationary communications satellite 60 with the conformal antenna 33 and with one of the top-surface antennas 50 and one of the bottom-surface antennas 52, although the geostationary communications satellite 60 is much lower in the sky than in the case of the aircraft 20 flying at 37 degrees latitude, FIG. 8. When the aircraft 20 banks 30 degrees to the right, FIG. 11, these lines of sight are significantly altered. The line of sight to the geostationary communications satellite 60 of the conformal antenna 33 and the right top-surface antenna 50 are obscured by the structure of the aircraft 20, but the line of sight to the geostationary communications satellite 60 of the left-side bottom-surface antenna 52 is maintained. If the aircraft 20 had only the conformal antenna 33, communications to the geostationary communications satellite 60 would be lost during the period of the 30-degree right bank. But as long as a line of sight 64 between any one of the antennas 33, 50, and 52 and the geostationary communications satellite 60 is maintained, communications between the aircraft 20 and the geostationary communications satellite 60 is maintained.

FIGS. 8-11 illustrate communications for the aircraft flying in a generally westerly direction in the northern hemisphere. The left top-surface antenna 50 and the right bottom-surface antenna 52 provide a similar improvement in communications capability for the aircraft 20 flying in a generally easterly direction in the northern hemisphere. Similar improvements are obtained for an aircraft flying in the southern hemisphere.

FIGS. 8-11 provide a few examples of the wide range of geometric relationships that are possible between the aircraft 20 in flight and the line of sight to the geostationary communications satellite 60. It is apparent, however, that the addition of the top-surface antenna 50 and the bottom-surface antenna 52, operating in conjunction with the conformal antenna 33, significantly increases the global communications coverage of the line-of-sight communications of the aircraft 20 with the geostationary communications satellites 60 that provide important communications capabilities.

The top-surface antenna 50 and the bottom-surface antenna 52 also aid in maintaining communications when the aircraft 20 has a north-south component to its direction of travel. When the aircraft 20 is flying in a northerly direction in the northern hemisphere and is thence flying away from the geostationary communications satellite 60, during level flight or normal descent the aircraft flies in a level or slightly nose-high orientation. The top-surface antenna 50 maintains the communications link with the geostationary communications satellite. When the aircraft 20 is flying in a southerly direction in the northern hemisphere and is thence flying toward the geostationary communications satellite 60, a communications link is maintained by the antennas 33, 50, and 52 for most flight attitudes. However, during climb the aircraft may be pointing directly at the geostationary communications satellite 60 so that none of the antennas 33, 50, and 52 achieve a communications link. This is a worst case for the antenna system. An auxiliary antenna such as a nose-mounted antenna may be required to maintain the communications link.

An important feature of the present approach is that the antennas 50 and 52 may be provided in new-aircraft construction and also in retrofits of existing aircraft. The wing extensions 36 in the form of the winglets 38 or the wing-tip pods 40 may be built into a newly constructed aircraft, or they may be provided as an aftermarket addition. The use of the winglets 38 and the wing-tip pods 40 as the platforms for the antennas 50 and 52 does not adversely affect the performance of the aircraft 20, and in fact can improve the performance. The winglets 38 improve aerodynamic performance by controlling vortices at the wing tips, and the wing-tip pods add load-carrying capacity for cargo and/or fuel to the aircraft 20.

Figure 12:
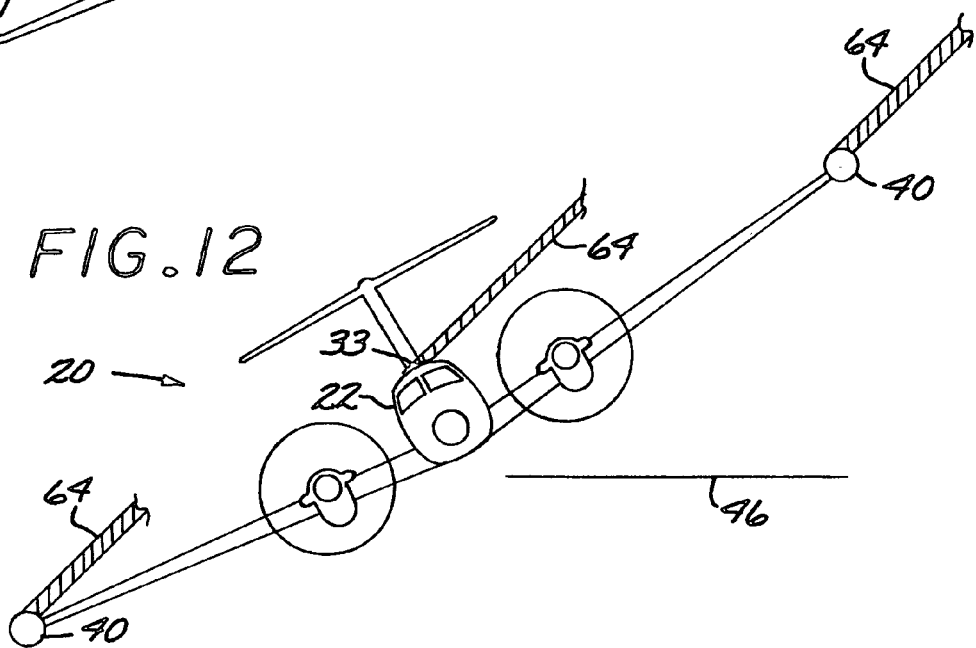
FIG. 12 is a schematic antenna-coverage indication for an aircraft using tip-pod antennas flying at 37 degrees latitude in a 30 degree bank away from the remote link.

In the embodiment of FIG. 12, the aircraft 20 with wing-tip pods 40 is illustrated flying at 37 degrees latitude in a 30 bank away from the remote link. The top-surface antennas 50 and bottom surface antennas 52 are mounted on the wing-tip pods 40 to maintain the communications link with the geostationary communications satellite.

Figure 13:
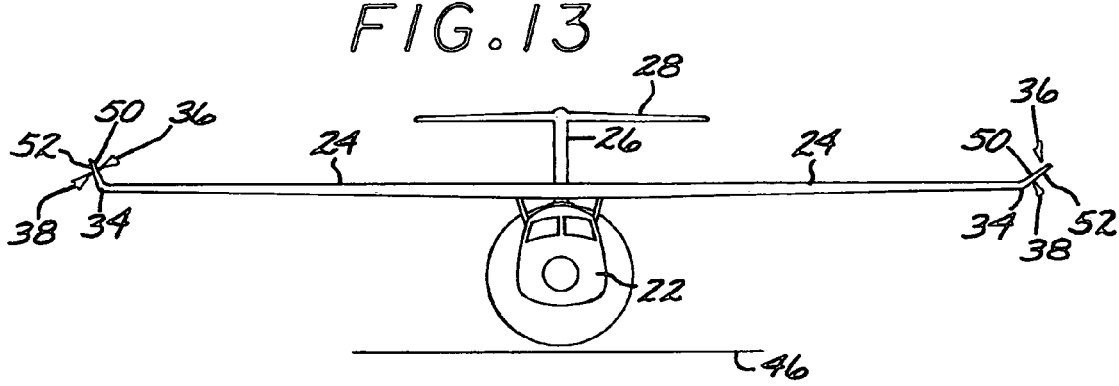
FIG. 13 is a front view of a second embodiment of an aircraft according to the present approach with a high wing having wing extensions.

FIGS. 1-6 and 8-12 have illustrated the present invention used in conjunction with a conventional aircraft design in which the wings 24 are joined to the opposite sides of the fuselage 22 (and usually to each other via a wing-carry-through structure that extends through the interior of the fuselage). The present approach is also operable with less-conventional aircraft designs such as that shown in FIG. 13. In this design, the wings 24 are joined together at their proximal ends above (or below) the fuselage 22 without the fuselage 22 between them, so that there is essentially a single aerodynamic wing structure formed by the joining of the two wings 24. Such designs are found, for example, in some high-wing personal and business aircraft, but also are increasingly found in unmanned aircraft such as battlefield and other surveillance aircraft. FIG. 13 also illustrates that the present approach may use asymmetric wing extensions 36 (i.e., where the left wing extension and the right wing extension are not oriented at the same angle to the horizontal plane). The present approach may also be used where the engine or engines are mounted in locations other than in the wings, such as for example a nose-mounted puller or a tail-mounted pusher configuration.

The present approach may also be used by siting the antennas in other locations on the aircraft, and FIGS. 14-18 illustrate some possibilities. Each configuration is illustrated in a 30-degree bank at 37 degrees latitude, and communicating with a satellite in geostationary orbit. In each case, elements common with prior embodiments are assigned the same reference numbers, and the prior description is incorporated here.

Figure 14:
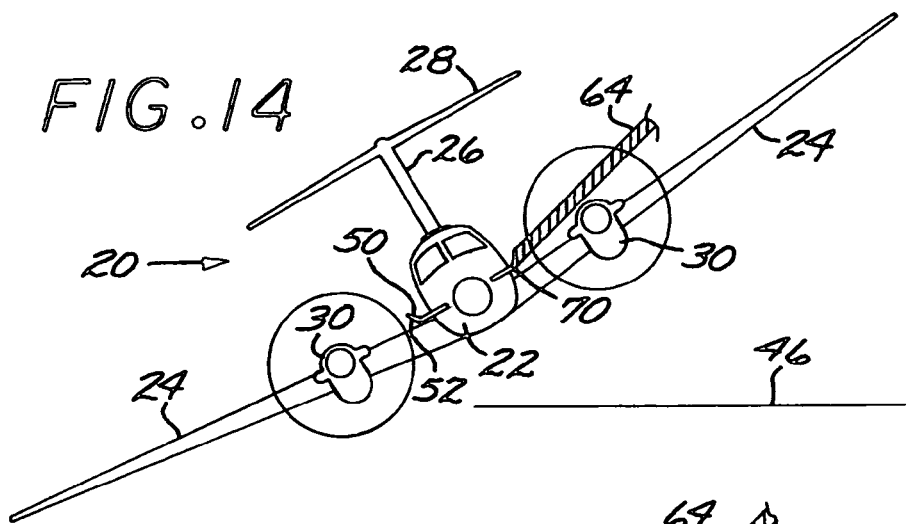
FIG. 14 is a schematic antenna-coverage indication for an aircraft using canard-mounted antennas flying at 37 degrees latitude in a 30 degree bank away from the remote link.

In the embodiment of FIG. 14, the aircraft has canards 70 extending from the fuselage 22. The wing extensions 36 extend from the canards 70. The top-surface antennas 50 and bottom surface antennas 52 are mounted on the wing extensions 36 of the canards 70.

Figure 15:
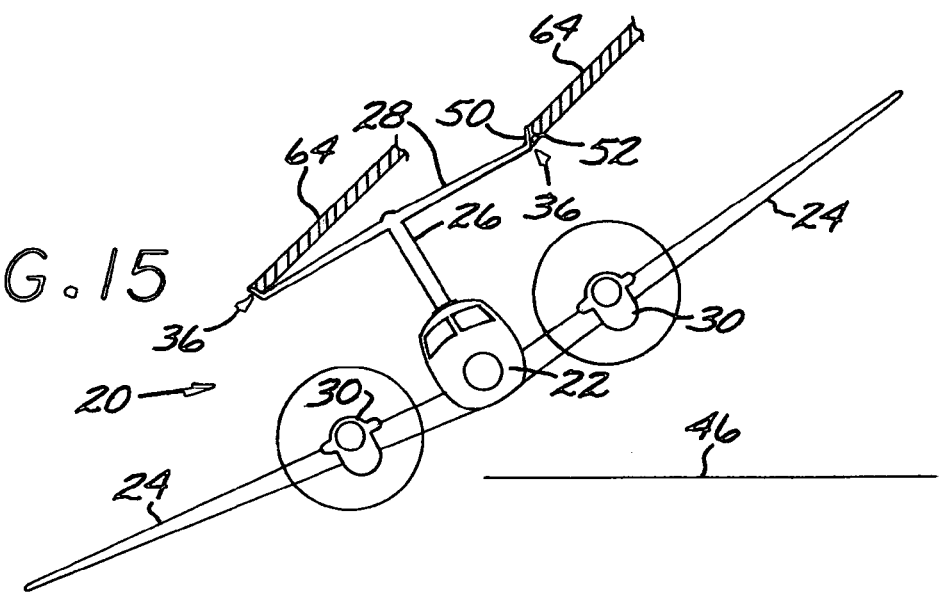
FIG. 15 is a schematic antenna-coverage indication for an aircraft using antennas mounted on upwardly extending extensions of the horizontal-stabilizer flying at 37 degrees latitude in a 30 degree bank away from the remote link.

In the embodiment of FIG. 15, the aircraft has wing extensions 36 (also termed "tailets") extending upwardly and outwardly from the horizontal stabilizer 36. The top-surface antennas 50 and bottom surface antennas 52 are mounted on the wing extensions 36 of the horizontal stabilizer 36.

Figure 16:
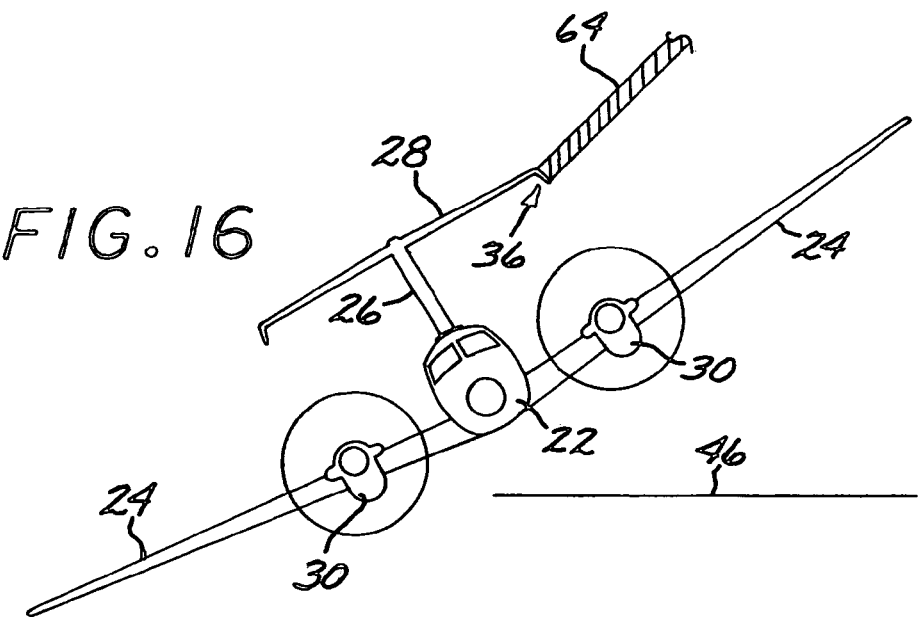
FIG. 16 is a schematic antenna-coverage indication for an aircraft using antennas mounted on downwardly extending extensions of the horizontal-stabilizer flying at 37 degrees latitude in a 30 degree bank away from the remote link.

In the embodiment of FIG. 16, the aircraft has wing extensions (tailets) 36 extending downwardly from the horizontal stabilizer 36. The top-surface antennas 50 and bottom surface antennas 52 are mounted on the wing extensions 36 of the horizontal stabilizer 36. Downwardly extending wing extensions 36 may also be used at the ends of the wings 24, in configurations otherwise similar to those illustrated in FIGS. 1, 3, 6, 8-11, and 13.

In the embodiment of FIG. 17, the aircraft has wing extensions 36 in the form of fuselage strakes 72 extending from the fuselage 22 at a downward or an upward angle. The top-surface antennas 50 and bottom surface antennas 52 are mounted on the wing extensions 36 of fuselage strakes 72.

In the embodiment of FIG. 18, the aircraft has wing extensions 36 in the form of stabilons 74 extending generally horizontally from the fuselage 22. The top-surface antennas 50 and bottom surface antennas 52 are mounted on the wing extensions 36 of stabilons 74.

The top-surface antennas 50 and bottom surface antennas 52 may also be mounted to the fuselage, vertical tail, or engine cowlings, as illustrated in FIGS. 19-21.

In the embodiment of FIG. 19, the top-surface antennas 50 and bottom surface antennas 52 are mounted on the fuselage 22.

In the embodiment of FIG. 20, the top-surface antennas 50 and bottom surface antennas 52 are mounted on an engine cowling 76 that encloses an engine 30.

In the embodiment of FIG. 21, the top-surface antennas 50 and bottom surface antennas 52 are mounted on a top of the vertical tail 26.

In some designs not within the scope of the present invention, the only phased array antennas on the aircraft are mounted in an aerodynamic housing that is affixed to the fuselage of the aircraft. The antenna mounted in this manner can lose its signal and communications link with the satellite or other remote transceiver when the aircraft is operating at relatively high latitudes and then banks, so that a portion of the aircraft structure lies between the antenna and the satellite while the aircraft is in the bank. The use of this housed-antenna approach has other drawbacks as well, including adding weight and bulk, increasing aerodynamic drag, and presenting an unappealing visual appearance.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An aircraft comprising:
a fuselage;
a first aerodynamic surface joined to the fuselage and having a first distal end remote from the fuselage, wherein the first aerodynamic surface has a first dihedral angle relative to a horizontal plane;
a first-aerodynamic-surface extension joined to the first distal end of the first aerodynamic surface, wherein the first-aerodynamic-surface extension has a first-aerodynamic-surface-extension top surface and a first-aerodynamic-surface-extension bottom surface, said top and bottom surfaces being major surfaces of the first-aerodynamic-surface extension, and wherein the first-aerodynamic-surface-extension top surface lies at a nonzero first-aerodynamic-surface-extension top-surface angle to the horizontal plane that is different from the first dihedral angle, and the first-aerodynamic-surface-extension bottom surface lies at a nonzero first-aerodynamic-surface-extension bottom-surface angle to the horizontal plane that is different from the first dihedral angle;
a first-extension top-surface antenna lying in the first-aerodynamic-surface-extension top surface of the first-aerodynamic-surface extension; and
a first-extension bottom-surface antenna lying in the first-aerodynamic-surface-extension bottom surface of the first-aerodynamic-surface extension.

2. The aircraft of claim 1, wherein each of the first-aerodynamic-surface-extension top-surface angle and the first-aerodynamic-surface-extension bottom-surface angle is from about 30 to about 75 degrees.

3. The aircraft of claim 1, wherein the first-aerodynamic-surface-extension top-surface angle is about 65 degrees.

4. The aircraft of claim 1, wherein the first-aerodynamic-surface extension is a winglet.

5. The aircraft of claim 1, wherein the first-aerodynamic-surface extension is a wing-tip pod.

6. The aircraft of claim 1, wherein the first-extension top-surface antenna and the first-extension bottom-surface antenna are each flat-panel antennas.

7. The aircraft of claim 1, wherein the first-extension-top-surface antenna and the first-extension bottom-surface antenna are each phased-array antennas.

8. The aircraft of claim 1, wherein the aircraft further includes
a second aerodynamic surface joined to the fuselage, wherein the second aerodynamic surface extends generally oppositely to the first aerodynamic surface and has a second distal end remote from the fuselage, and wherein the second aerodynamic surface has a second dihedral angle relative to the horizontal plane,
a second-aerodynamic-surface extension joined to the second distal end of the second aerodynamic surface, wherein the second-aerodynamic-surface extension has a second-aerodynamic surface-extension top surface and a second-aerodynamic-surface-extension bottom surface, and wherein the second-aerodynamic-surface-extension top surface lies at a nonzero second-aerodynamic-surface-extension top-surface angle to the to the horizontal plane that is different from the second dihedral angle, and the second-aerodynamic-surface-extension bottom surface lies at a nonzero second-aerodynamic-surface-extension bottom-surface angle to the horizontal plane that is different from the second dihedral angle,
a second-extension top-surface antenna lying in the second-aerodynamic-surface-extension top surface of the second-aerodynamic-surface extension, and
a second-extension bottom-surface antenna lying in the second-aerodynamic-surface-extension bottom surface of the second-aerodynamic-surface extension.

9. The aircraft of claim 1, wherein the aircraft further includes
a second aerodynamic surface joined to the fuselage, wherein the second aerodynamic surface extends generally oppositely to the first aerodynamic surface and has a second distal end remote from the fuselage, and wherein the second aerodynamic surface has the first dihedral angle relative to the horizontal plane,
a second-aerodynamic-surface extension joined to the second distal end of the second aerodynamic surface, wherein the second-aerodynamic-surface extension has a second-aerodynamic-surface-extension top surface and a second-aerodynamic-surface-extension bottom surface, and wherein the second-aerodynamic-surface-extension top surface lies at a nonzero second-aerodynamic-surface-extension top-surface angle to the to the horizontal plane that is different from the first dihedral angle, and the second-aerodynamic-surface-extension bottom surface lies at a nonzero second-aerodynamic-surface-extension bottom-surface angle to the horizontal plane that is different from the first dihedral angle,
a second-extension top-surface antenna lying in the second-aerodynamic-surface-extension top surface of the second aerodynamic-surface extension, and
a second-extension bottom-surface antenna lying in the second-aerodynamic-surface-extension bottom surface of the second-aerodynamic-surface extension.

10. The aircraft of claim 1, wherein the aircraft further includes
a second aerodynamic surface joined to the fuselage, wherein the second aerodynamic surface extends generally oppositely to the first aerodynamic surface and has a second distal end remote from the fuselage, wherein the second aerodynamic surface has the first dihedral angle relative to the horizontal plane, and wherein the second aerodynamic surface is continuous with the first aerodynamic surface,
a second-aerodynamic-surface extension joined to the second distal end of the second aerodynamic surface, wherein the second-aerodynamic-surface extension has a second-aerodynamic-surface-extension top surface and a second-aerodynamic-surface-extension bottom surface, and wherein the second-aerodynamic-surface-extension top surface lies at a nonzero second-aerodynamic-surface-extension top-surface angle to the to the horizontal plane that is different from the first dihedral angle, and the second-aerodynamic-surface-extension bottom surface lies at a nonzero second-aerodynamic-surface-extension bottom-surface angle to the horizontal plane that is different from the first dihedral angle, a second-extension top-surface antenna lying in the second-aerodynamic-surface-extension top surface of the second aerodynamic-surface extension, and a second-extension bottom-surface antenna lying in the second-aerodynamic-surface-extension bottom surface of the second-aerodynamic-surface extension.

11. An aircraft comprising:

a fuselage;

a pair of wings joined to the fuselage, wherein each wing has a distal end remote from the fuselage, and wherein each wing is oriented at a dihedral angle to a horizontal plane;

a wing extension joined to the distal end of each of the wings, wherein each of the wing extensions has a top surface and a bottom surface, the top and bottom surfaces being major surfaces of the wing extensions, and wherein the top surfaces lie at a nonzero top-surface angle to the horizontal plane that is different from the dihedral angle, and the bottom surfaces lie at a nonzero bottom-surface angle to the horizontal plane that is different from the dihedral angle;

a top-surface antenna lying in one of the top surfaces; and a bottom-surface antenna lying in one of the bottom surfaces.

12. The aircraft of claim 11, wherein there are two top-surface antennas and two bottom-surface antennas, and wherein one of the top-surface antennas lies in each of the top surfaces; and one of the bottom-surface antennas lies in each of the bottom surfaces.

13. The aircraft of claim 11, wherein the top-surface angle and the bottom-surface angle are each from about 30 to about 75 degrees.

14. The aircraft of claim 11, wherein the top-surface angle and the bottom-surface angle are each about 65 degrees.

15. The aircraft of claim 11, wherein the wing extensions are winglets.

16. The aircraft of claim 11, wherein the wing extensions are wing-tip pods.

17. The aircraft of claim 11, wherein the top-surface antenna and the bottom-surface antenna are each flat-panel antennas.

18. The aircraft of claim 11, wherein the top-surface antenna and the bottom-surface antenna are each phased-array antennas.

* * * * *

UNITED STATES PATENT AND TRADEMARK OFFICE
CERTIFICATE OF CORRECTION

PATENT NO.       : 7,624,951 B1                                          Page 1 of 1
APPLICATION NO.  : 11/499223
DATED            : December 1, 2009
INVENTOR(S)      : Kraft et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 750 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,624,951 B1 | Page 1 of 1 |
| APPLICATION NO. | : 11/499223 | |
| DATED | : December 1, 2009 | |
| INVENTOR(S) | : John R. Kraft et al. | |

It is certified that error appears in the above-identified patent and that said Letters Patent is hereby corrected as shown below:

Column 1, lines 20-21, "internet" should read -- Internet --.
Column 2, line 1, "electronically steered" should read -- electronically-steered --.
Column 2, line 3, "mechanically steerable" should read -- mechanically-steerable --.
Column 3, line 61, "line, of" should read -- line of --.
Column 3, line 62, "is maintained" should read -- are maintained --.
Column 9, line 5, "is maintained" should read -- are maintained --.
Column 12, line 8, "to the to the" should read -- to the --.
Column 12, line 36, "to the to the" should read -- to the --.
Column 12, line 65, "to the to the" should read -- to the --.

Signed and Sealed this

First Day of February, 2011

David J. Kappos
*Director of the United States Patent and Trademark Office*